United States Patent
McGough et al.

(10) Patent No.: US 12,538,982 B1
(45) Date of Patent: Feb. 3, 2026

(54) SEAT CUSHION WITH ORIENTATION BASED COMFORT EXPERIENCES

(71) Applicant: Jordan Manufacturing Company, Inc., Monticello, IN (US)

(72) Inventors: Jacob McGough, Battleground, IN (US); Pamela Flaherty, Monticello, IN (US)

(73) Assignee: Jordan Manufacturing Company, Inc., Monticello, IN (US)

( * ) Notice: Subject to any disclaimer, the term of this patent is extended or adjusted under 35 U.S.C. 154(b) by 0 days.

(21) Appl. No.: 19/017,372

(22) Filed: Jan. 10, 2025

(51) Int. Cl.
| | | |
|---|---|---|
| *A47C 7/00* | (2006.01) | |
| *A47C 7/02* | (2006.01) | |
| *A47C 7/18* | (2006.01) | |
| *B32B 3/26* | (2006.01) | |
| *B32B 5/02* | (2006.01) | |
| *B32B 5/18* | (2006.01) | |
| *B32B 5/24* | (2006.01) | |
| *B32B 5/26* | (2006.01) | |
| *B32B 5/32* | (2006.01) | |
| *B32B 7/022* | (2019.01) | |

(52) U.S. Cl.
CPC ............... *A47C 7/18* (2013.01); *A47C 7/021* (2013.01); *B32B 3/263* (2013.01); *B32B 5/022* (2013.01); *B32B 5/18* (2013.01); *B32B 5/245* (2013.01); *B32B 5/266* (2021.05); *B32B 5/32* (2013.01); *B32B 7/022* (2019.01); *B32B 2262/0276* (2013.01); *B32B 2266/0228* (2013.01); *B32B 2266/0278* (2013.01); *B32B 2307/546* (2013.01); *B32B 2601/00* (2013.01)

(58) Field of Classification Search
CPC .. A47C 7/18; A47C 7/021; B32B 7/00; B32B 7/02; B32B 7/022; B32B 5/266; B32B 5/00; B32B 5/022; B32B 5/18; B32B 5/245; B32B 5/32; B32B 3/263; B32B 2262/0276; B32B 2266/0228; B32B 2266/0278; B32B 2307/546; B32B 2601/00
See application file for complete search history.

(56) References Cited

U.S. PATENT DOCUMENTS

| | | | |
|---|---|---|---|
| 2,320,425 | A | 6/1943 | Glaes et al. |
| 3,844,613 | A * | 10/1974 | Waldorf ................. B29C 44/04 5/409 |
| 3,939,508 | A | 2/1976 | Hall et al. |
| 4,190,697 | A | 2/1980 | Ahrens |
| 4,755,411 | A | 7/1988 | Wing et al. |
| 5,638,564 | A | 6/1997 | Greenawalt et al. |
| D479,082 | S | 9/2003 | Daughtery et al. |
| 6,830,293 | B2 | 12/2004 | Vanderminden |

(Continued)

FOREIGN PATENT DOCUMENTS

| | | |
|---|---|---|
| FR | 2914831 A1 | 10/2008 |
| GB | 2526065 A | 11/2015 |

*Primary Examiner* — Chi Q Nguyen
(74) *Attorney, Agent, or Firm* — Barnes & Thornburg

(57) ABSTRACT

A seat for supporting an occupant includes a cushion including a first portion having a first stiffness and a second portion having a second stiffness. The second portion having a matching and opposite contour as the first portion. The cushion is positionable on a seat bottom in a plurality of orientations relative to the seat bottom to provide varying comfort sensations to the occupant based on the orientation of the cushion relative to the seat bottom.

14 Claims, 12 Drawing Sheets

(56) References Cited

U.S. PATENT DOCUMENTS

| | | | |
|---|---|---|---|
| 7,406,733 | B2 | 8/2008 | Coffield et al. |
| 7,481,491 | B1 | 1/2009 | Diamantis |
| 7,681,264 | B2 | 3/2010 | Graebe |
| 7,819,484 | B2 | 10/2010 | Conforti |
| D690,962 | S | 10/2013 | Danileson |
| 9,332,850 | B2 | 5/2016 | Krishtul |
| 9,421,890 | B2 * | 8/2016 | Akutsu .................... B60N 2/72 |
| 9,446,697 | B2 * | 9/2016 | Akutsu ................. B60N 2/5825 |
| D830,729 | S | 10/2018 | Alletto, Jr. |
| D935,805 | S | 11/2021 | Zhou |
| D943,311 | S * | 2/2022 | Szparski ......................... D6/601 |
| D998,384 | S | 9/2023 | Polupanova |
| D1,019,203 | S * | 3/2024 | Zou ................................ D6/601 |
| 12,108,883 | B2 * | 10/2024 | Skochenski .......... A47C 31/113 |
| D1,073,367 | S * | 5/2025 | Chen .............................. D6/601 |
| 2016/0143442 | A1 * | 5/2016 | Nakada ............. B64D 11/0647 |
| | | | 297/452.48 |
| 2017/0164746 | A1 * | 6/2017 | Phillips .................. A47C 7/029 |
| 2018/0079338 | A1 * | 3/2018 | Takemoto ................ B60N 2/64 |
| 2020/0311252 | A1 * | 10/2020 | Huziak ................... G06F 9/547 |
| 2025/0091317 | A1 * | 3/2025 | Bhargava .................. B32B 5/32 |
| 2025/0169610 | A1 * | 5/2025 | Deng ..................... A47C 7/742 |

* cited by examiner

SEAT CUSHION WITH ORIENTATION BASED COMFORT EXPERIENCES

FIELD OF THE DISCLOSURE

The present disclosure relates generally to seats for supporting an occupant thereon, and more specifically to seat cushions for providing comfort to the occupant supported on the seat.

BACKGROUND

Seat furniture, such a couches, chairs, and vehicle seats, include a furniture base with a seat bottom for supporting an occupant thereon. Some seat furniture are design to be used with or without cushions to soften the seats. For example, removable seat cushions may be used with wooden chairs and couches or outdoor furniture may use seat pads intended to always be sat on by the occupant, while being easily removable for cleaning, storage, or replacement.

Traditional seat cushions are designed to be positioned in one orientation or two orientations (flipped over) relative to the furniture seat bottom. That is, typically, seat cushions have an intended front and an intended rear. In some cases, because the seat cushion has an intended rear that is typically not visible, the seat cushion may include a zipper that extends along the rear and a portion of the sides of the seat cushion for access into the interior chamber of a cover of the seat cushion. These seat cushions provide a single stiffness profile and comfort sensation to the occupant which is set by the manufacturer based on the intended orientation and cannot be altered by the occupant.

Accordingly, there is a need for seat cushions that can provide varying comfort sensations to the occupant to account for preferences between different occupants or between inclinations of one occupant.

SUMMARY

The present disclosure may comprise one or more of the following features and combinations thereof.

According to an aspect of the present disclosure, a seat for supporting an occupant thereon includes a furniture base having a seat bottom for supporting the occupant and a cushion positioned on the seat bottom. The cushion includes a first layer and a second layer. The first layer has a first surface and a non-planar second surface spaced apart from and opposite the first surface of the first layer. The second layer has a non-planar first surface and a second surface spaced apart from and opposite the first surface of the second layer. The second surface of the first layer is matching and opposite in contour of the first surface of the second layer and engaged with the first surface of the second layer. The first layer has a first stiffness and the second layer has a second stiffness different from the first stiffness.

The seat bottom and the cushion are sized such that the cushion is positionable on the seat bottom in a plurality of orientations relative to the seat bottom to provide varying comfort sensations to the occupant based on the orientation of the cushion. The plurality of orientations may include a first orientation, a second orientation, a third orientation, and a fourth orientation. In the first orientation, the second surface of the second layer faces the seat bottom. The second orientation is arranged 90 degrees about a first axis from the first orientation in which the second surface of the second layer faces the seat bottom. The third orientation is flipped over to be arranged 180 degrees about a second axis perpendicular to the first axis from the first orientation in which the first surface of the first layer faces the seat bottom. The fourth orientation is arranged 90 degrees about the first axis from the third orientation in which the first surface of the first layer faces the seat bottom.

In some embodiments, the first surface of the first layer is generally planar, the second surface of the second layer is generally planar, and the contour of the second surface of the first layer extends without varying shape between a first lateral side of the cushion and a second lateral side of the cushion. The first lateral side extends between and interconnects the first surface and the second surface of the first layer. The second lateral side extends between and interconnects the first surface and the second surface of the cushion of the first layer.

In some embodiments, the contour of the second surface of the first layer is symmetric about a line. The line extends perpendicular to the first surface of the first layer and the second surface of the second layer and located midway between the first lateral side and the second lateral side of the cushion.

In some embodiments, the second surface of the first layer is defined by a first portion of a wave pattern. The first surface of the second layer is defined by a second portion of the wave pattern. In some embodiments, the first portion of the wave pattern includes a single peak of the wave pattern. The second portion of the wave pattern includes only two peaks of the wave pattern. In some embodiments, the wave pattern is a sinusoidal wave pattern.

In some embodiments, the second material is different from the first material. In some embodiments, the first surface of the first layer and the second surface of the second layer are square when viewed from above and the first surface of the first layer is generally parallel with the second surface of the second layer.

In some embodiments, the seat includes a liner arranged around the cushion. The liner is formed to define a first chamber that receives the cushion therein and a second chamber with loose filling therein. The liner includes a first closable opening that opens into the first chamber to allow the cushion to be removed and re-inserted into the first chamber. The liner includes a second closable opening that opens into the second chamber and the first chamber to provide access to the second chamber from the first chamber. The cushion is located in the liner to locate the first surface of the first layer between the second surface of the second layer and the second chamber.

According to another aspect of the disclosure, a seat for supporting an occupant thereon includes a cushion. The cushion including a first portion having a first stiffness and a second portion adjacent the first portion and having a second stiffness different than the first stiffness. The first portion has a non-planar first end profile and the second portion having a non-planar second end profile. The first end profile matches and is opposite the second end profile.

The cushion has a first surface and a second surface spaced apart from and opposite the first surface to locate the first end profile and the second end profile between the first surface and the second surface. The cushion has a same area footprint, when viewed from above looking at the first surface, for a first orientation, a second orientation rotated 90 degrees relative to a first axis from the first orientation, a third orientation rotated 180 degrees relative to a second axis perpendicular to the first axis from the first orientation, and a fourth orientation rotated 90 degrees about the first axis relative to the third orientation.

In some embodiments, the first end profile is defined by a first portion of a wave pattern having a single peak of the wave pattern. The second end profile is defined by a second portion of the wave pattern having a single trough of the wave pattern. In some embodiments, the first portion is made of a first material and the second portion is made of the first material.

In some embodiments, the seat includes a furniture base having a seat bottom for supporting the occupant and the cushion is positioned on the seat bottom. The cushion is movable relative to the furniture base.

In some embodiments, the seat bottom and the cushion are sized such that the cushion is positionable on the seat bottom in each of the first orientation, second orientation, third orientation, and fourth orientation relative to the seat bottom to provide varying comfort sensations to the occupant based on the orientation of the cushion. In some embodiments, the cushion is compressed between portions of the furniture base, adjacent cushions, or a portion of the furniture base and an adjacent cushion located on opposite sides of the cushion to removably couple the cushion with the furniture base.

According to another aspect of the disclosure, a method of making a seat cushion includes a number of steps. The method may include providing a first material having a first stiffness, providing a second material having a second stiffness that is different from the first stiffness, forming a male layer from the first material, the male layer having a planar first surface and a non-planar second surface spaced apart from and opposite the first surface of the male layer, forming a female layer from the second material, the female layer having a non-planar first surface that is opposite a contour of the second surface of the male layer and a planar second surface spaced apart from and opposite the first surface of the female layer, nesting the second surface of the male layer into the first surface of the female layer.

In some embodiments, forming the male layer from the first material includes cutting a first portion of a wave pattern into the first material to form the second surface of the male layer. Forming the female from the second material includes cutting a second portion of the second wave pattern into the second material to form the first surface of the female layer.

In some embodiments, the first portion of the wave pattern includes a single peak of the wave pattern. The second portion of the wave pattern includes only two peaks of the wave pattern.

In some embodiments, the wave pattern is a sinusoidal, square, and triangle wave pattern. In some embodiments, the second material is different from the first material.

In some embodiments, cutting the first portion of the wave pattern into the first material to form the second surface of the male layer simultaneously forms a segment of a second male layer for a second cushion out of the first material.

These and other features of the present disclosure will become more apparent from the following description of the illustrative embodiments.

BRIEF DESCRIPTION OF THE DRAWINGS

The detailed description particularly refers to the accompanying figures in which.

DETAILED DESCRIPTION

Figure 1A:
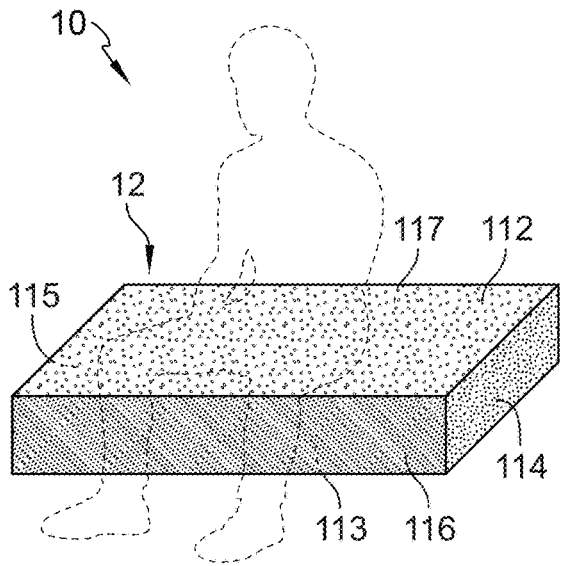
FIG. 1A is a perspective view of a seat in accordance with the present disclosure with an occupant supported thereon, the seat having a cushion formed with varying stiffness throughout the cushion and positioned in a first orientation to provide a first comfort sensation to the occupant.
Figure 1B:
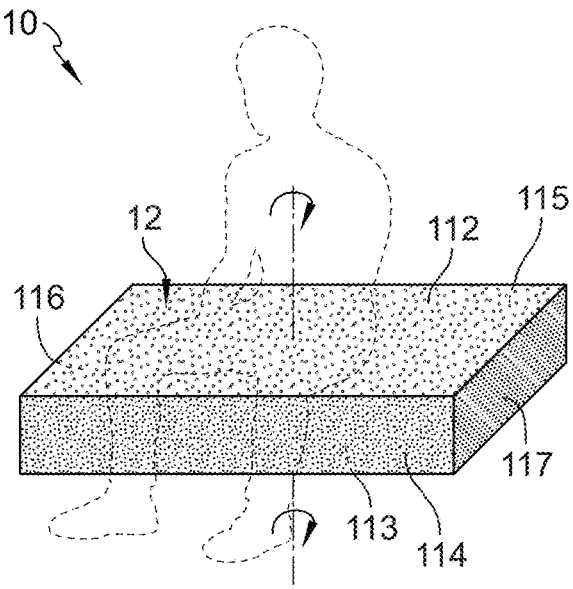
FIG. 1B is a perspective view of the cushion of FIG. 1 in a second orientation 90 degrees from the first orientation to provide a second comfort sensation to the occupant.
Figure 1C:
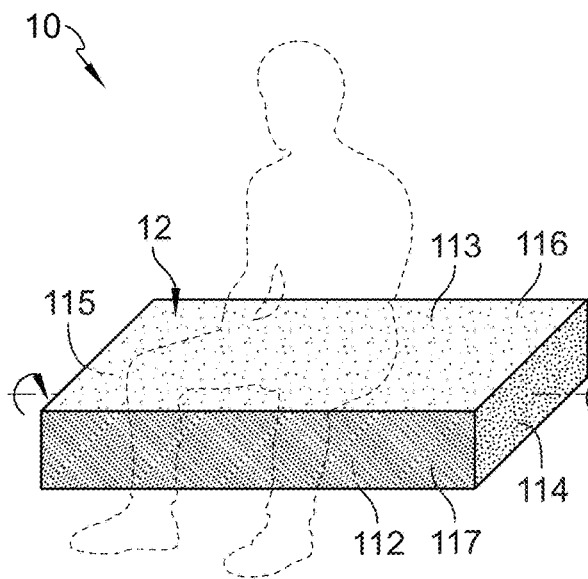
FIG. 1C is a perspective view of the cushion of FIG. 1 in a third orientation flipped over to be 180 degrees from the first orientation to provide a third comfort sensation to the occupant.
Figure 1D:
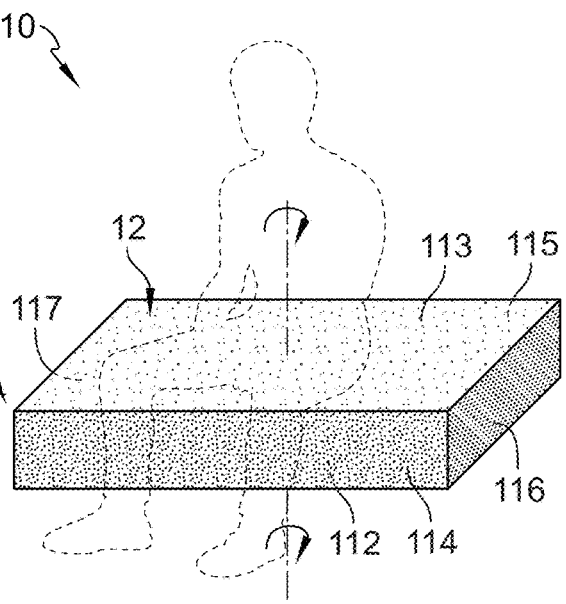
FIG. 1D is a perspective view of the cushion of FIG. 1 in a fourth orientation 90 degrees from the third orientation to provide a fourth comfort sensation to the occupant.

A seat 10 in accordance with the present disclosure includes a cushion 12 for supporting an occupant thereon as shown in FIGS. 1A-1D. The seat 10 may further include a furniture base 30 as shown in FIGS. 5-8. Such furniture bases 30 may include indoor and outdoor furniture. For example, the furniture base 30 may be a couch or chair. The seat cushion 12 provides unique levels of comfort by innovating different fills in cushion outer fabric shells and using multiple layers of materials including nonwoven fiber media and various foam types. The multiple layers of materials leverage different densities, thicknesses, stiffnesses and other material properties to provide the seat cushion 12 that supports the occupant differently and provides varying comfort sensations depending on the orientation of the seat cushion 12. The comfort sensation may include a feeling of stiffness, deformation or deflection over time as the occupant settles into the cushion 12. The material properties may include any one or more of thickness, density, stiffness, thermal conductivity, porosity, etc. The stiffness may be determined by uniaxial compression testing (Indentation Force Deflection (IFD), Indentation Load Deflection (ILD), or any other suitable measurement standard. The stiffness of each layer may vary throughout the given layer due to material properties and layer geometry. However, the average stiffness of one layer may be greater or less than the other layers of the cushion 12.

The cushion 12 has a first surface 112 and a second surface 113 as well as side surfaces 114, 115, 116, 117. In the illustrative embodiment, the combination of layers provide at least four different support configurations to the occupant based on how the cushion 12 is orientated relative to the furniture as suggested in FIGS. 1A-1D. In a first orientation relative to the furniture base 30, the seat cushion 12 provides a first comfort sensation to the occupant as suggested in FIG. 1A. The cushion 12 may be rotated 90 degrees about a first axis to a second orientation to provide a second comfort sensation to the occupant that differs from the first comfort sensation as suggested in FIG. 1B. The cushion 12 may be flipped over from the first orientation 180 degrees relative to a second axis that is perpendicular to the first axis to be positioned in a third orientation that provides yet a third comfort sensation to the occupant as suggested in FIG. 1C or rotated 90 degrees relative to the first axis from the third orientation to a fourth orientation that provides a fourth comfort sensation as suggested in FIG. 1D. In other embodiments, the cushion 12 may be constructed such that different degrees of rotation other than 90 degrees may be used to achieve the varying comfort sensations.

Conventional cushions may have common homogeneous fill materials that are uniform throughout the cushion and the comfort to the occupant may be limited by the material properties of the singular material. As the occupant sits on the cushion, the applied load (i.e. weight of the occupant) is distributed throughout the cushion. The initial resistance of the cushion may be typically low and then rapidly increases at a critical point where the fill material starts to densify as suggested by line 14 in the graph showing load (occupant weight as it is applied to the cushion) vs. displacement in FIG. 2. The end of the region where the material starts to densify is commonly referred to as the point where the cushion "bottoms out" and is indicated by point 16 on line 14 in FIG. 2.

Figure 3:
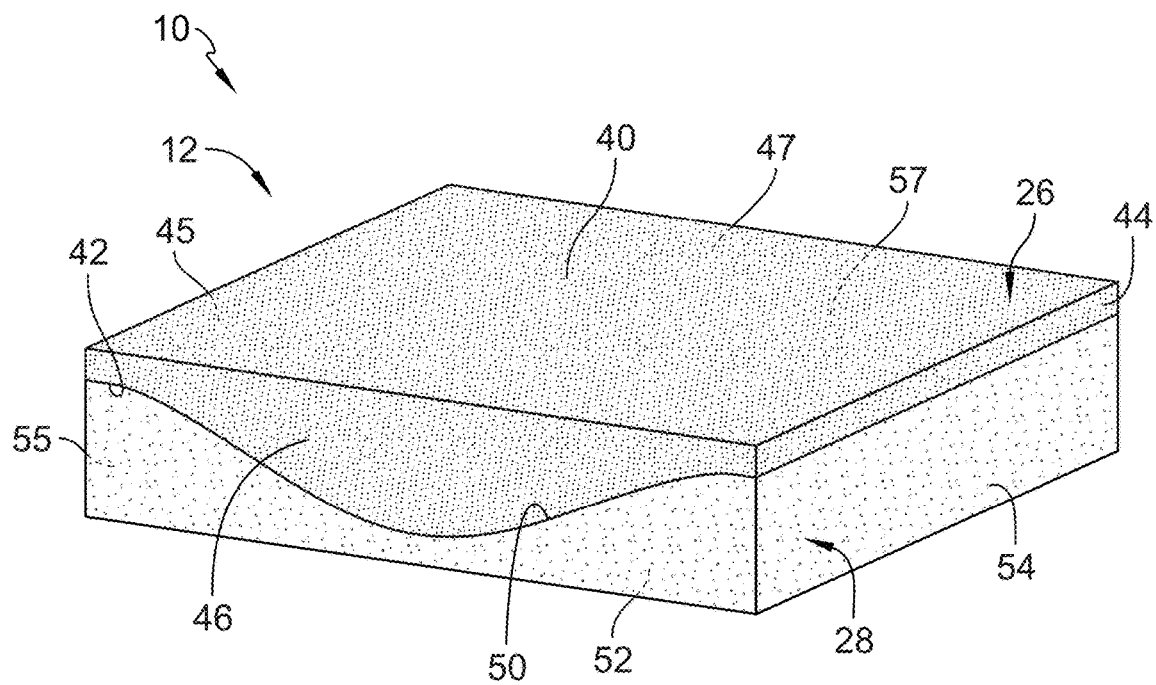
FIG. 3 is a perspective view of an embodiment of the cushion of FIGS. 1A-D showing the cushion having a first layer having a first contour and a first stiffness and a second layer having a second contour matching and opposite the first contour and having a second stiffness different from the first stiffness.
Figure 4:
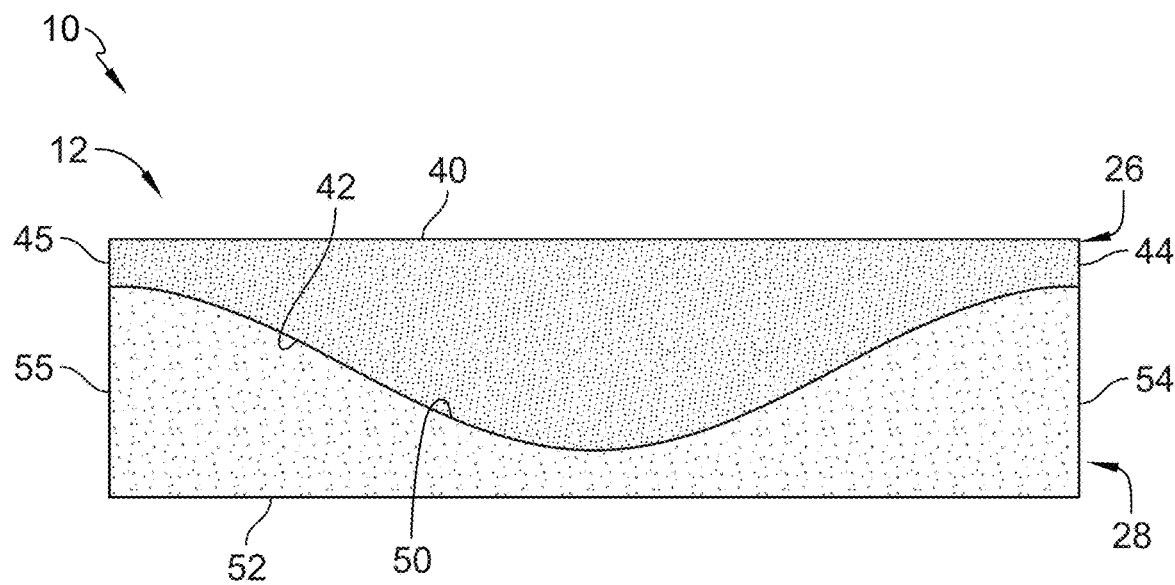
FIG. 4 is an elevation view of the cushion of FIG. 2 showing the first contour is defined by a portion of a sinusoidal wave pattern and the second contour is defined by another portion of the same sinusoidal wave pattern.

The cushion 12 of the present disclosure includes multiple layers of varying stiffness as suggested in FIGS. 3 and 4 which allow the cushion 12 to provide different comfort sensations to the occupant. The cushion 12 includes a first layer 26 having a first stiffness and a second layer 28 having a second stiffness that is different from the first layer 26. The layers of varying stiffness allow some layers to densify while the other layers may still be in their elastic region. This mechanism is used to create more comfortable experiences for the occupant and allows a singular product to be "reversible" and provide multiple support structures. The layers 26, 28 are non-homogenous relative to each other.

The layers 26, 28 may be a same or different material such as, for example, the layers 26, 28 may both be a same foam material, different foam materials, a same fiber material, a fiber material and a foam material, etc. In cushions 12 having layers 26, 28 of the same material, the layers 26, 28 would have different stiffness or other material properties. For example, in a nonwoven fiber, two instances of the material may both be 100% polyester and therefore be the same material, but each instance may have a different density and or stiffness. In other embodiments, two layers may have the same stiffness or material and properties, but such stiffness or material properties would be different from a third layer. The layers 26, 28 may be independent components that can be fit together and separated from one another. Alternatively, the layers 26, 28 may integrally formed together as a single, monolithic component. For example, the cushion 12 may be manufactured using a buildup process that causes the layer 28 to be relatively stiff and to transition layer 26 while making the layer 26 relatively less stiff. The layer 26 may be referred to as a male layer and the layer 28 may be referred to as a female layer in the illustrative embodiment. The cushion 12 is shown without a cover, such as cover 80, in certain figures, such as FIGS. 3-8 to illustrate the orientation of the layers 26, 28. The cushion 12 may be used with or without a cover in practice.

Figure 5:
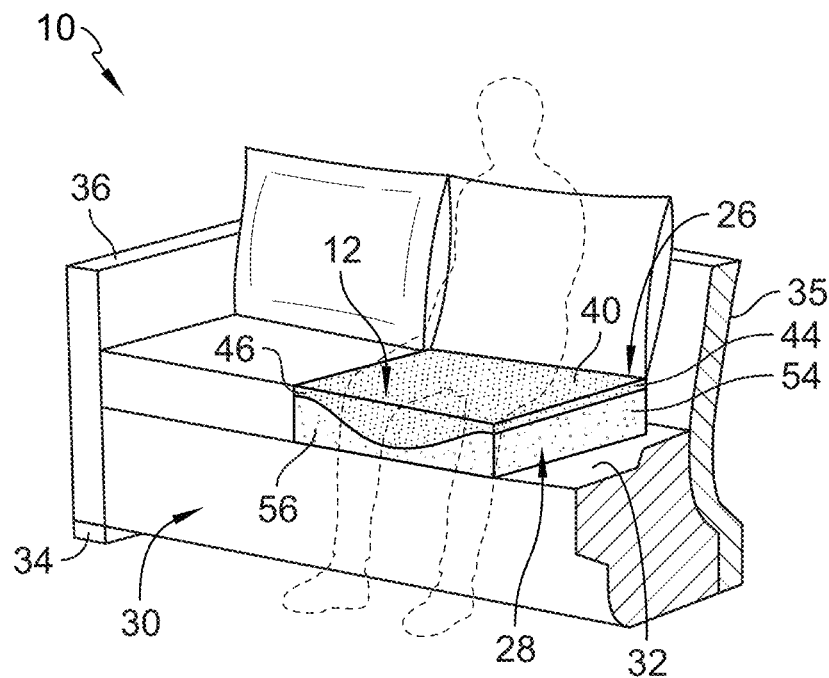
FIG. 5 is a perspective view of a seat with portion cutaway to reveal the cushion of FIG. 2 supported on a couch furniture base with the cushion in the first orientation to cause the different stiffness and profiles of the layers of the cushion to provide a first comfort sensation to the occupant.
Figure 6:
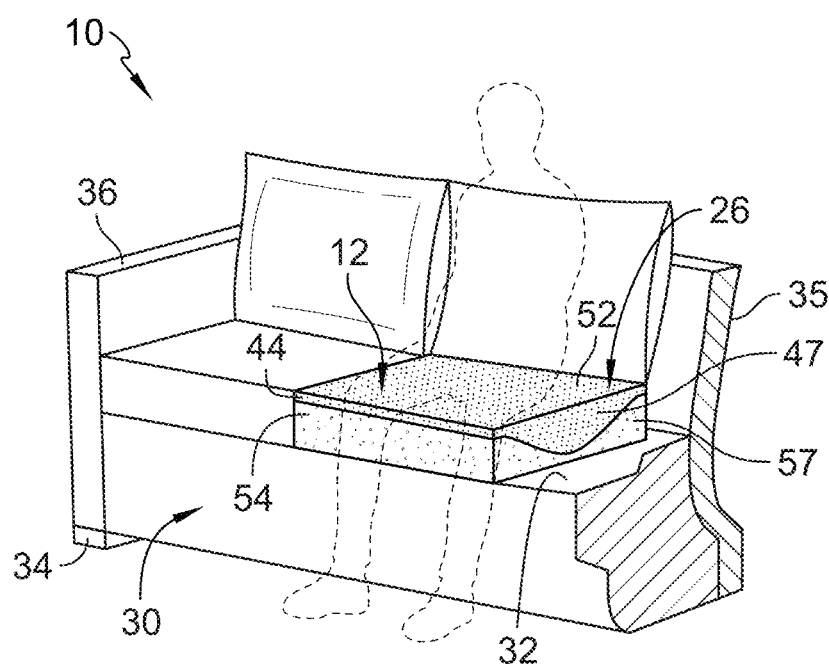
FIG. 6 is a perspective view of the seat of FIG. 5 with the cushion rotated 90 degrees to the second orientation to cause the different stiffness and profiles of the layers of the cushion to provide a second comfort sensation to the occupant.

Placing a more compliant (less stiff) layer 26 on top of the stiffer layer 28 allows the compliant layer to start to densify while the stiffer layer 28 is only slightly deformed as suggested in FIGS. 5 and 6. This multi-layer structure transitions the occupant to their sitting position with a more gradual increase in resistance as suggested by line 18 of FIG. 2. The cushion 12 has a bottom out point 20 that occurs earlier than the single material cushion indicated by line 14. Using additional layers provides further control over the resistance profile of the cushion 12.

Figure 2:
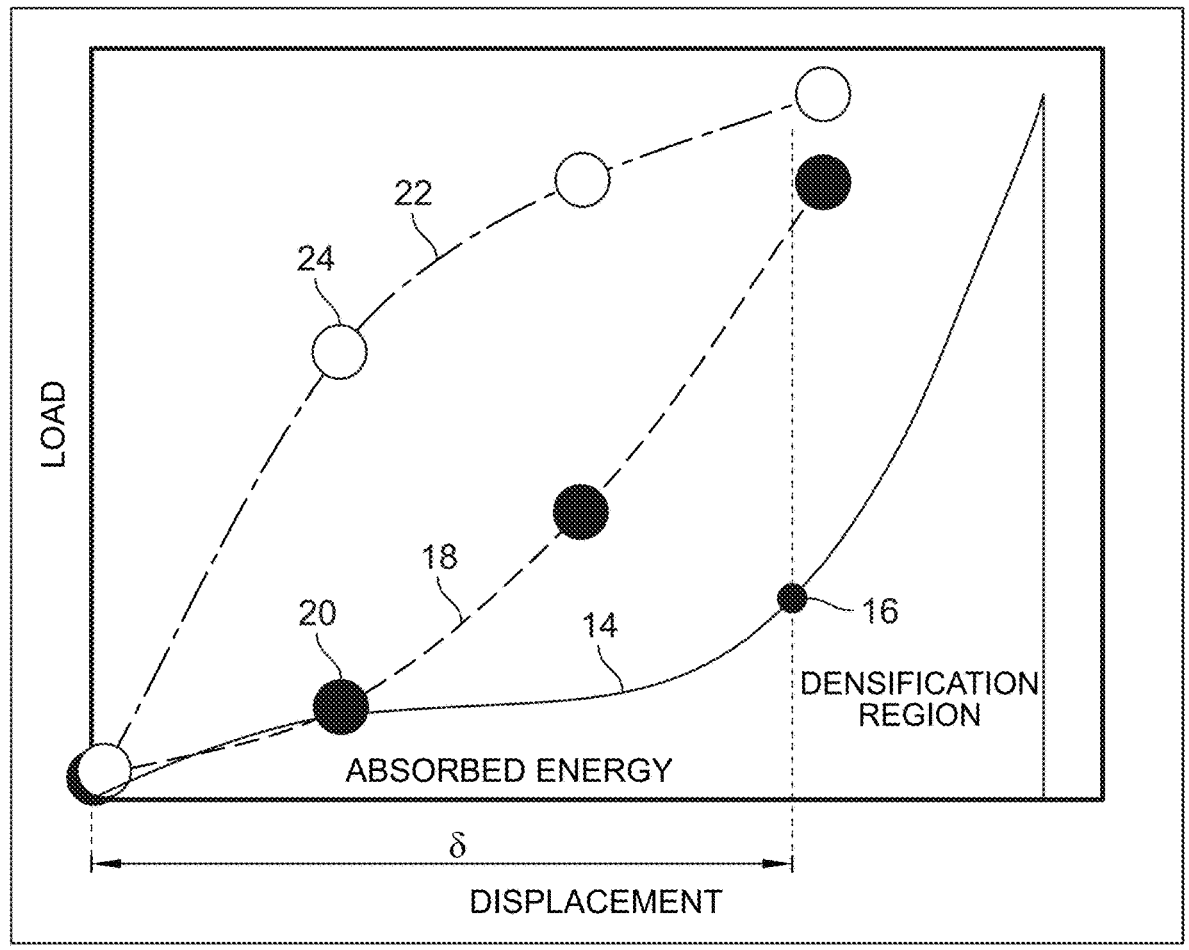
FIG. 2 is graph showing representative relative displacement of cushions compared to the load applied to the cushion as indicative of an increasing load as the occupant's weight is applied to the cushion as the occupant sits down, the graph showing different curves associated with the cushion of FIGS. 1A-1D as compared to a conventional cushion.
Figure 7:
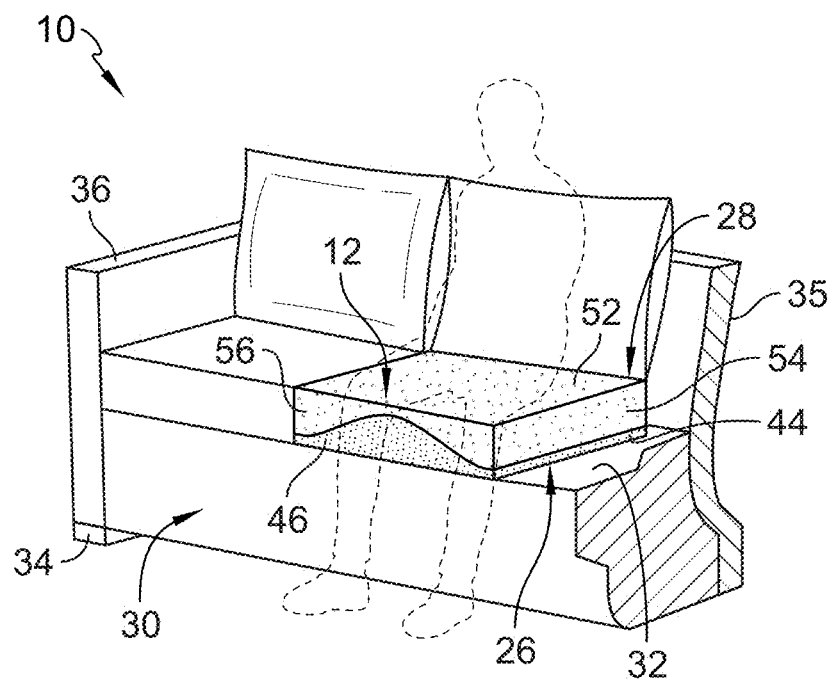
FIG. 7 is a perspective view of the seat of FIG. 5 with the cushion flipped over and rotated 180 degrees from the first orientation to the third orientation to cause the different stiffness and profiles of the layers of the cushion to provide a third comfort sensation to the occupant.
Figure 8:
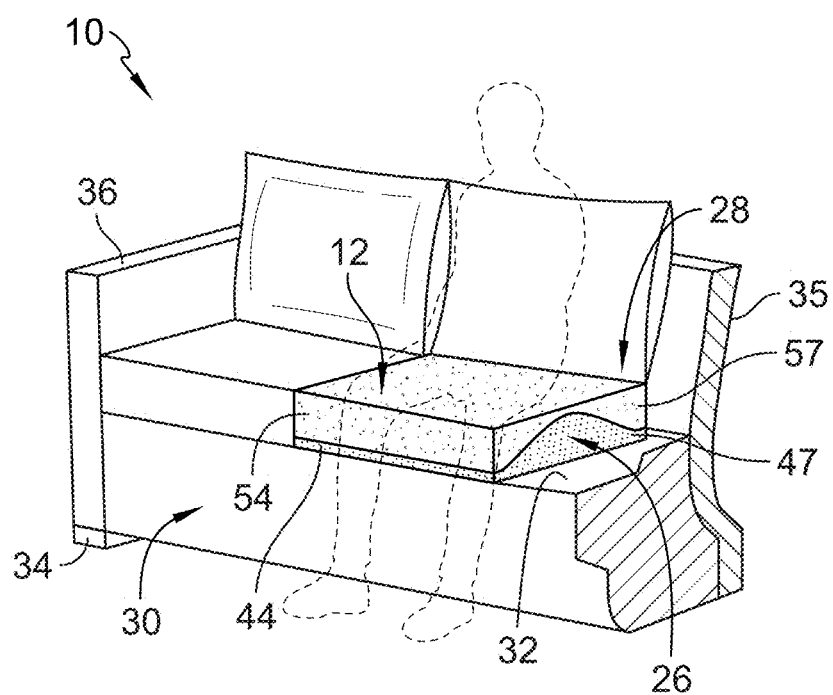
FIG. 8 is a perspective view of the seat of FIG. 7 with the cushion rotated 90 degrees to the fourth orientation to cause the different stiffness and profiles of the layers of the cushion to provide a fourth comfort sensation to the occupant.

Conversely, locating the stiffer layer 28 on top of the more compliant (less stiff) layer 26, as shown in FIGS. 7 and 8, gives a more rapid initial increase in resistance followed by a gradual increase to the final equilibrium position as suggested by line 22 of FIG. 2. The cushion 12 has a bottom out point 24 that occurs earlier than the bottom out points 16, 20. In each orientation of the cushion 12, the more compliant layer 26 will deform first, however, in the second example (FIGS. 7 and 8), the stiffer layer 28 will distribute the load from the occupant more evenly over the compliant layer 26, resulting in more initial resistance from the same amount of fill material. Building on this concept, layers with non-uniform properties such as thickness, density, stiffness, thermal conductivity, porosity, etc. can be used to enhance the users experience and provide additional configurations/options to the occupant. In other embodiments, the layer 26 may be the relatively more stiff layer as compared to the layer 28. In some embodiments, the layers 26, 28 each include portions of relatively low stiffness and portions of relatively high stiffness.

The seat 10 includes the cushion 12 and may further include the furniture base 30 as suggested in FIGS. 5-8. The furniture base 30 includes a seat bottom 32 for supporting the occupant thereon. Typical furniture bases 30 include legs 34 or other support structure extending from the seat bottom 32 to the ground or floor and a seat back 35 that extends upwardly away from the seat bottom 32. The illustrative furniture base 30 includes arm rests 36 spaced apart from the seat bottom 32 to support the occupant's arm thereon.

The seat 10 may include additional cushions such as, for example, a back rest cushion, throw pillows, etc. The illustrative seat bottom 32 is sized to fit multiple cushions 12 thereon and the cushions 12 may be arranged in each of at least four orientations on the seat bottom 32 as discussed below. The cushion 12 is compressed between portions of the furniture base 30 such as the armrests 36, adjacent cushions, or a portion of the furniture base and an adjacent cushion located on opposite sides of the cushion 12 to removably couple the cushion 12 with the furniture base 30. In other embodiments, the seat bottom 32 is sized to receive a single cushion 12. In other embodiments, the cushion 12 may be elongated or unique sized to fit an elongated or unique seat bottom 32 shape.

The cushion 12 is sized to fit on the seat bottom 32 in each of the at least four orientations. The cushion 12 may be sized to occupy the same footprint on the seat bottom 32 in each of the first, second, third, and fourth orientations. In other words, the perimeter of the cushion 12 is in generally the same location and has generally the same area on the seat bottom 23 in each of the orientations.

The layer 26 includes a first surface 40, a second surface 42 spaced apart from and opposite the first surface 40, a first lateral side 44, a second lateral side 45, a third lateral side 46, and a fourth lateral side 47. The lateral sides 44, 45, 46, 47 extend between and interconnect the first surface 40 and the second surface 42. The first surface 40 is a planar surface in the illustrative embodiment. As used herein, planar refers to a generally flat, uniform, two-dimensional surface. However, it should be understood that the cushion 12 is intentionally compliant and the planar surfaces may not be perfectly flat. Similarly, the lateral sides 44, 45, 46, 47 are each planar; however, in other embodiments, first surface 40 and/or the lateral sides 44, 45, 46, 47 may be non-planar or a singular ellipse side (circular or elliptical cushion for example). The second surface 42 is non-planar in the illustrative embodiment. The non-planar surfaces are non-uniform in at least one direction and not a flat, two-dimensional surface. The non-planar surfaces may be curved or include two or more flat surfaces that are angled relative to each other. The first surface 40 and the second surface 42 are square shaped when viewed from above in the illustrative embodiment. The square shape allows the cushion to be rotated by 90 degrees increments while maintaining the same footprint on the seat bottom 32.

The layer 28 includes a first surface 50, a second surface 52 spaced apart from and opposite the first surface 50, a first lateral side 54, a second lateral side 55, a third lateral side 56, and a fourth lateral side 57. The second surface 52 is generally parallel with the first surface 40. The lateral sides 54, 55, 56, 57 extend between and interconnect the first surface 50 and the second surface 52. The first surface 50 is non-planar in the illustrative embodiment. The second surface 52 is planar in the illustrative embodiment. Similarly, the lateral sides 54, 55, 56, 57 are each planar; however, in other embodiments, second surface 52 and/or the lateral sides 54, 55, 56, 57 may be non-planar or a singular ellipse side (circular or elliptical cushion for example). The first surface 50 and the second surface 52 are square shaped when viewed from above in the illustrative embodiment.

The second surface 42 of the first layer 26 matches and is opposite in contour of the first surface 50 of the second layer 28 so that the second surface 42 is engaged and nested with the first surface 50 as shown in FIGS. 3 and 4. The second surface 42 and the first surface 50 of the second layer 28

In addition to the different material properties of the layers 26, 28, the surfaces 42, 50 of the layers 26, 28 are non-planar to distribute the load of the occupant differently depending on orientation of the cushion 12 relative to the seat bottom 32 as suggested in FIGS. 5-8. The non-planar profile of the surfaces 42, 50 may be defined by any matching and opposite contours. The surfaces 42, 50 of the cushion 12 of FIGS. 4-8 are defined by a wave pattern as the surfaces 42, 50 extend between the lateral sides 44, 54 and 45, 55. The contour of the first surface 50 of the second layer 28 extends without varying shape between the lateral side 56 and the lateral side 57 of the cushion 12.

Figure 13:
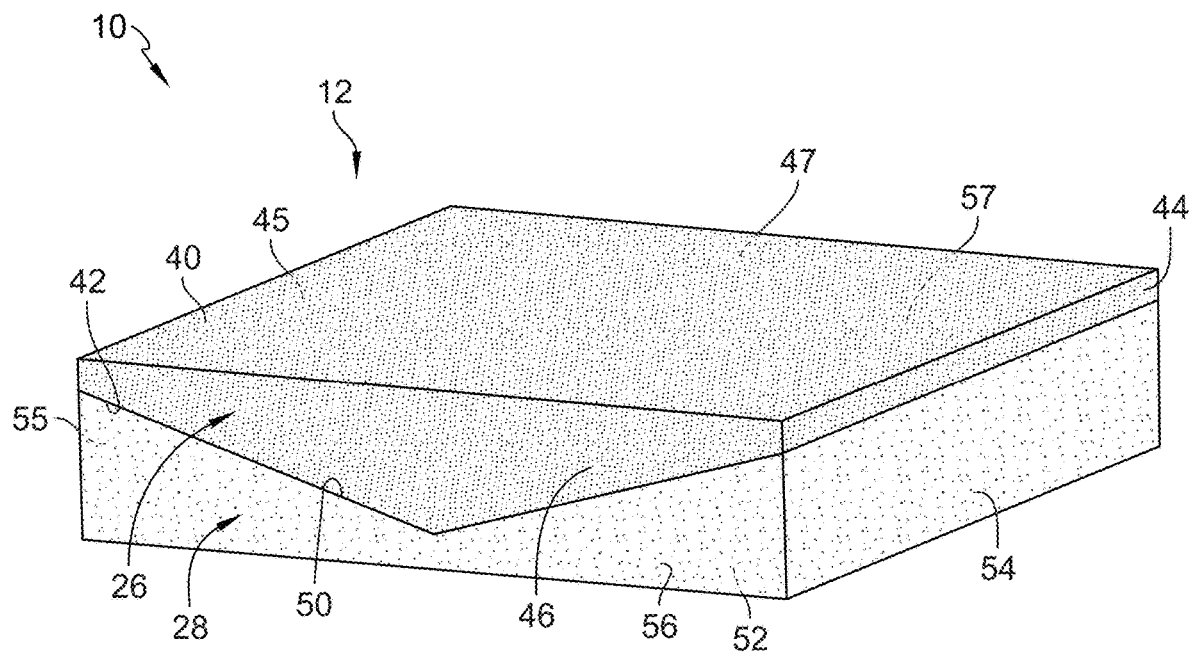
FIG. 13 is a perspective view of a cushion having layers of varying stiffness and the layers defined by a triangle wave pattern.
Figure 14:
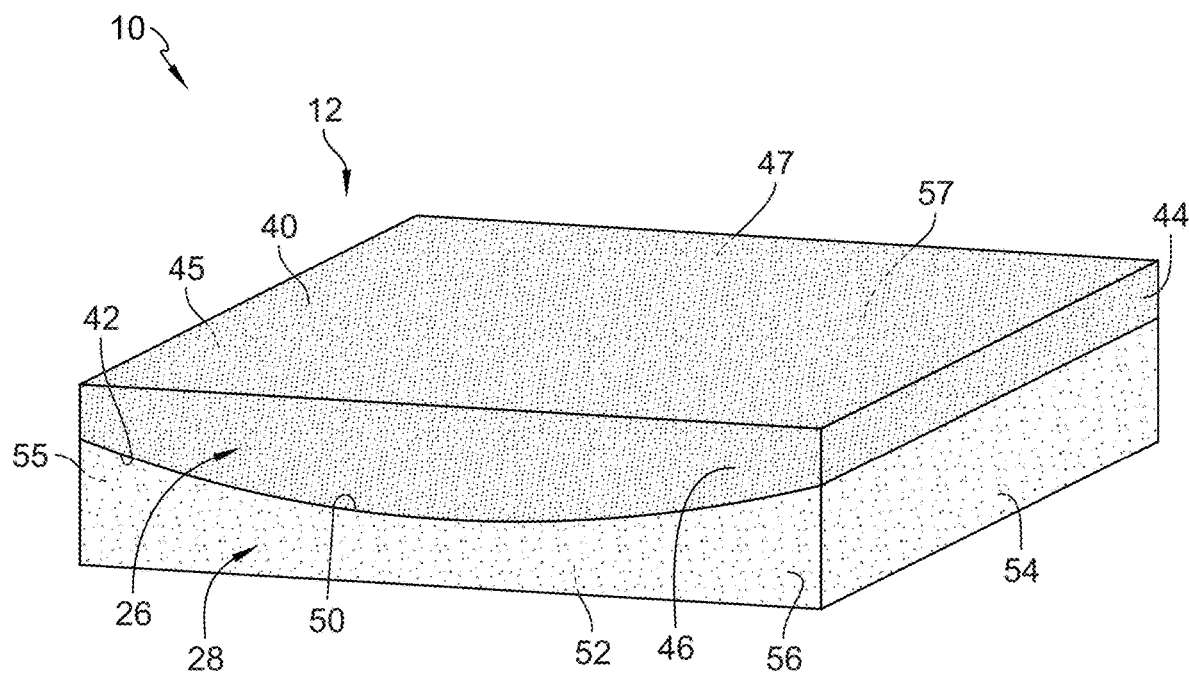
FIG. 14 is a perspective view of a cushion having layers of varying stiffness and the layers defined by a parabolic wave pattern.
Figure 15:
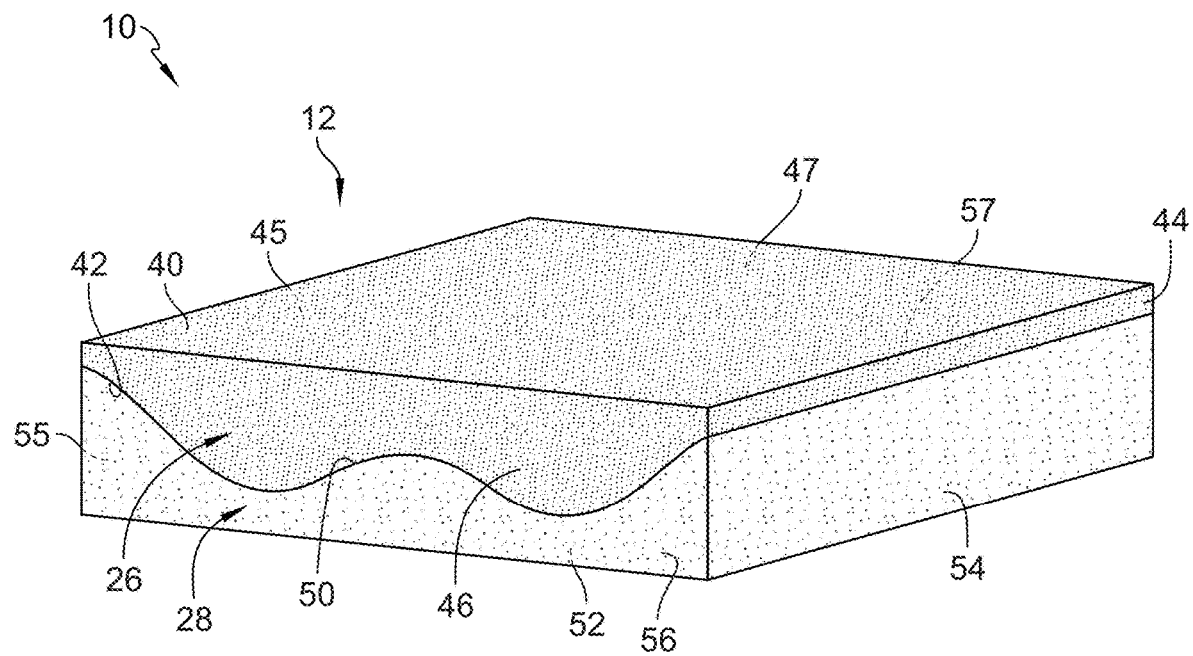
FIG. 15 is a perspective view of a cushion having layers of varying stiffness and the layers defined by a parabolic sinusoidal wave pattern.
Figure 16:
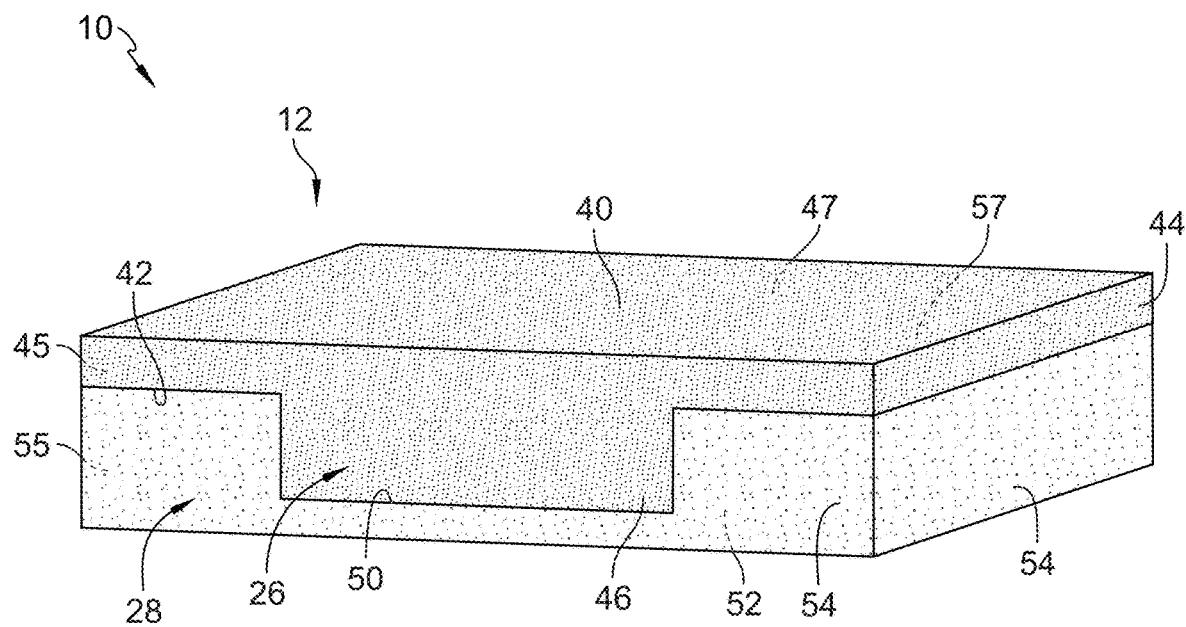
FIG. 16 is a perspective view of a cushion having layers of varying stiffness and the layers defined by a square wave pattern.
Figure 17:
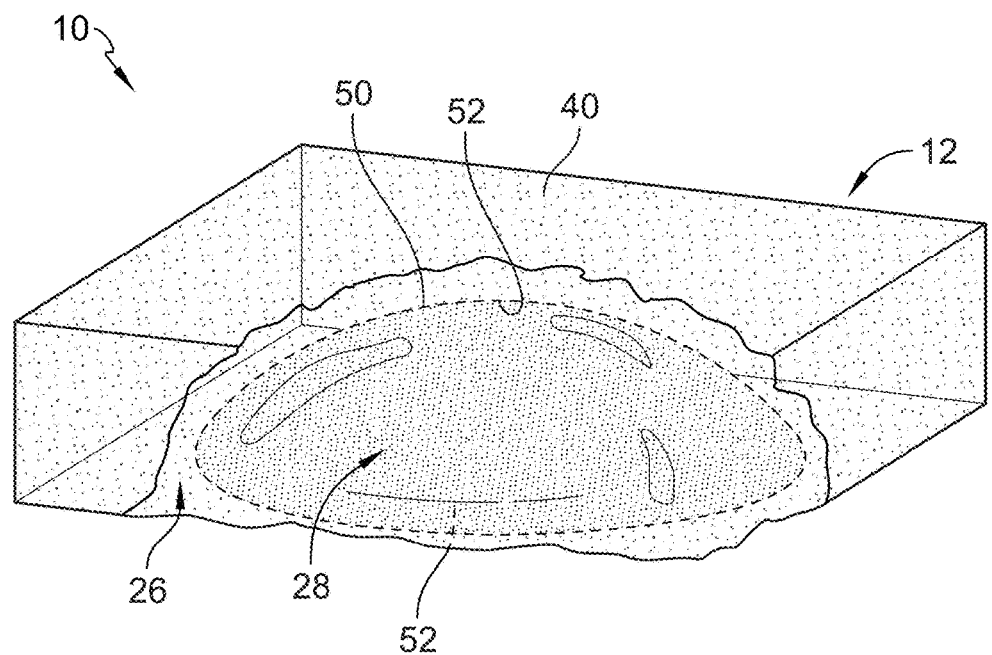
FIG. 17 is a perspective view of a cushion having layers of varying stiffness and the layers defined by a dome shape and inverse dome shape.
Figure 18:
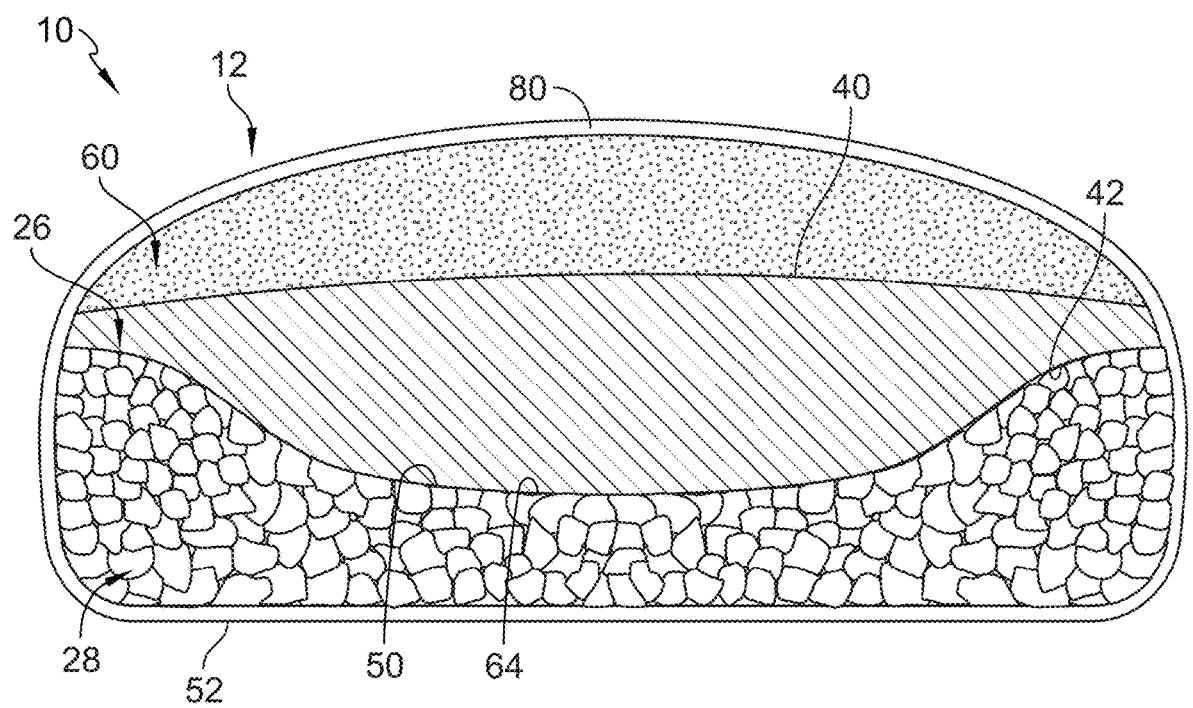
FIG. 18 is a section view of a cushion having layers of varying stiffness, the cushion having multiple layers of varying stiffness, and one of the layers formed from a jacket having predetermined shape to mate with an adjacent layer and loose fill within the jacket.

The second surface 42 of the first layer 26 is defined by a first portion of the wave pattern and the first surface 50 of the second layer 28 is defined by a second portion of the wave pattern. The wave pattern may be a sinusoidal wave as shown in FIGS. 3-8, a triangular wave as shown in FIG. 13; a parabolic wave as show in FIG. 14, varying in amplitude or frequency such as a parabolic sinusoid as shown in FIG. 15, a square wave as shown in FIG. 16, or any other suitable wave shape. In other embodiments, the contours of the surfaces 42, 50 may be three-dimensional as shown in FIGS. 17 and 18.

The first portion of the wave pattern may include any portion of the wave pattern while the second portion of the wave pattern is the portion that matches and is opposite to the first portion. As an example, the first portion may be a trough, a peak, and a trough of a sinusoidal wave pattern as shown in FIGS. 3-8. The second portion may be a peak, a trough, and a peak of the same sinusoidal wave pattern as shown in FIGS. 3-8. The first layer 26 includes a single peak and only two troughs while the second layer 28 includes a single trough and only two peaks for the cushion 12. However, the layers 26, 28 may include alternative numbers of peaks and troughs. The layers 26, 28 need not start and end at peaks or troughs at the lateral sides 44, 45, 54, 55.

The contour of the second surface 42 of the first layer 26 and the first surface 50 of the second layer 28 extend between one lateral side 46, 56 to the other opposite lateral side 47, 57 without changing in profile. In other words the wave pattern extends entirely from the side 46, 56 to the side 47, 57. Any section through a plane of the cushion that is parallel with the sides 46, 47, 56, 57 is generally the same as any other section through a parallel plane. In the illustrative embodiment, the contour of the second surface 42 of the first layer 26 is symmetric about a line extending perpendicular to the first surface 40 of the first layer 26 and the second surface 52 of the second layer 28 and located midway between the lateral side 44 and the lateral side 45 of the cushion 12. The contour of the first surface 50 of the second layer 28 is similarly symmetrical. In other embodiments, the contour of the surfaces 42, 50 changes as the surfaces 42, 50 extend between the lateral sides 46, 47, 56, 57.

The wave pattern of the surfaces 42, 50 may be offset by a vertical wave offset (along y-axis on a typical graph of a wave) and/or a horizontal offset (x-axis on a typical graph of a wave) by any suitable amount. The cushion 12 may have a vertical offset such that the troughs of the wave are about 0 percent to about 90 percent of a height of the cushion 12 as measured between the first surface 40 and the second surface 52. At 0 percent, the trough would be at the first surface 40 and at 100 percent, the trough would be at the second surface 52. The vertical offset may be between about 0 percent and about 80 percent, about 0 percent and about 75 percent, about 0 percent and about 70 percent, about 0 percent and about 60 percent, about 0 percent and about 50 percent. The vertical offset may be between about 10 percent and about 90 percent, about 20 percent and about 90 percent, about 25 percent and about 90 percent, about 30 percent and about 90 percent, about 40 percent and about 90 percent, or about 50 percent and about 90 percent for example. In the illustrative embodiment, the vertical offset is about 20 percent such that material of the first layer 26 extends between the trough and the first surface 40. The vertical offset of the portion of the wave pattern of the second layer 28 is determined so that the first surface 50 of the second layer 28 matches the second surface 42 of the first layer 26.

Referring to FIG. 4, the cushion 12 is positioned in the first orientation relative to the seat bottom 32. The sine wave extends between the occupants left to right sides. In such orientation, the first layer 26 deforms more quickly than the second layer 28. The occupant sinks into the valley of the wave pattern and the stiffer second layer 28 may act to cradle/hug the occupant. The occupant experiences a uniform resistance across their legs and bottom (extending between sides 44, 45 and 54, 55); however, resistance is not uniform across the width of the cushion (extending between sides 46, 47, and 56, 57).

The cushion 12 may further be positioned in the second orientation as shown in FIG. 6. In the illustrative embodiment, the cushion 12 is rotated 90 degrees from the first orientation. In the second orientation the wave pattern extends front to back relative to the occupant. The first layer 26 deforms more quickly than the second layer 28. The occupant sinks into the valley of the wave pattern and the stiffer second layer 28 acts to prop the users legs up and shifts the occupant's body position. The occupant may not be "cradled" on either side, but instead is tilted back in the seat 10. Depending on the thickness of the cushion 12, the stiffness of the second layer 28 in the rear of the cushion 12 may act as lumbar support. The occupant experiences a uniform resistance across the width of the cushion, but not front to back.

The cushion 12 may further be positioned in the third orientation as shown in FIG. 7. In the illustrative embodiment, the cushion 12 is rotated 180 degrees from the first orientation (flipped over). The wave pattern extends between the occupant's left and right and the stiffness of the second layer 28 distributes the pressure of the occupant across the first layer 26. The first layer 26 deforms more quickly than the second layer 28, "dampening" the impact of the occupant sitting on the cushion 12. The dampening effect may be more significant than a cushion in the first orientation wherein the male layer stiffer than the female layer due to the thickness of the more compliant layer and the total support being greater than this third orientation of the cushion 12. The second layer 28 is stiff and not "cradle/hug" the user. The user experiences a uniform resistance across their legs and bottom, but resistance is not uniform across the width of the cushion 12.

The cushion 12 may further be positioned in the fourth orientation as shown in FIG. 8. In the illustrative embodiment, the cushion 12 is rotated 90 degrees from the third orientation. The wave pattern extends between the front and back of the occupant. In this orientation, the stiffer second layer 28 distributes the load over the more compliant first layer 26 and is firmer than the third orientation. The dampening effect may be more significant than in cushions 12 having a stiffer first layer 26 than the second layer 28 and being in the second orientation or fourth orientation. Depending on the occupant's posture, this fourth orientation may allow the occupant to "rock" forward or backward "teetering" on the crest of the wave. The occupant experiences a uniform resistance across the width of the cushion 12, but not front to back As another example, the first layer 26 may be stiffer than the second layer 28. Referring again to FIGS. 5-8 again and considering the first layer 26 to be stiffer than the second layer 28, the cushion 12 may be positioned in the first orientation, second orientation, third orientation, and fourth orientation to provide different comfort sensations to the occupant. The stiffness of the layers 26, 28 may be selected by the manufacturer to achieve desired comfort options. With the stiffnesses and four orientations described above and reversed stiffnesses and four orientations described below, a manufacturer may have eight comfort profiles to decide from, while only four can be achieved with a single illustrative cushion 12. In other embodiments, additional layers of varying stiffness and shape and overall cushion shape may allow for additional comfort profiles to design the cushion with.

Referring again to FIG. 5 with a cushion 12 having a stiffer first layer 26 than second layer 28, the wave pattern extends between the occupant's left and right in the illustrative first orientation. The stiffness of the first layer 26 distributes the pressure of the occupant across the second layer 28. The second layer 28 deforms more quickly than the first layer 26 because the second layer 28 is less stiff than the first layer 26, "dampening" the impact of the occupant sitting on the cushion 12. The occupant then sinks into the first layer 26 where the majority of the support is concentrated directly under the occupant. The occupant experiences a uniform resistance across their legs and bottom, but a non-uniform resistance across the width of the cushion 12.

Referring again to FIG. 6, the wave pattern extends between the occupant's front and back in the illustrative second orientation as a result of the cushion 12 being rotated 90 degrees from the first orientation. The greater stiffness of the first layer 26 distributes the pressure of the occupant across the second layer 28. The second layer 28 deforms more quickly than the first layer 26, "dampening" the impact of the occupant sitting on the cushion 12. The occupant then sinks into the first layer 26 where the majority of the support is concentrated directly under the occupant. Similar to the fourth orientation of FIG. 8 for cushions 12 with less stiff first layers 26, this orientation allows the occupant to "rock" forward or backward "teetering" on the crest of the wave pattern. The occupant experiences a uniform resistance across the width of the cushion 12, but a non-uniform resistance from front to back.

Referring to FIG. 7, the wave pattern extends between the occupant's left and right in the illustrative third orientation and the cushion 12 has been flipped 180 degrees from the first orientation. The second layer 28 deforms more quickly than the first layer 26 because the second layer 28 is less stiff than the first layer 26. The occupant is supported on the peak of the wave with freedom to rock side to side due to the compliance of the second layer 28. The total support may be less than the cushion 12 having the stiffer first layer 26 in the first orientation of FIG. 5. In this orientation, the occupant experiences a uniform resistance across their legs and bottom.

Rotating the cushion 12 by 90 degrees relative to the third orientation, the wave pattern extends from front to back as shown in FIG. 8. The second layer 28 deforms more quickly than the first layer 26 because of the relatively greater stiffness of the first layer 26. The occupant is supported on the peak of the wave with freedom to rock front to back due to the compliance of the second layer 28. The total support may be less than the same cushion in the second orientation. The occupant experiences a uniform resistance across the width of the cushion and a non-uniform resistance from front to back.

The layering of fill materials to create modular support configurations for the occupant may be applicable to a multitude of materials including polyurethane foams, gels, nonwoven fiber media, expanded polystyrene, loose fiber fill, loose down fill, and other materials that can be formed into one of the layers disclosed herein. Additionally, the geometry of layers 26, 28 is not limited to sinusoidal or wave pattern surfaces. Three-dimensional contours are contemplated such as bowl or dome shaped as shown in FIGS. 17 and 18 and pyramid shaped layers. Such layers may be symmetrical and provide reversible support structures by flipping the cushion 12 over 180 degrees.

Figure 9:
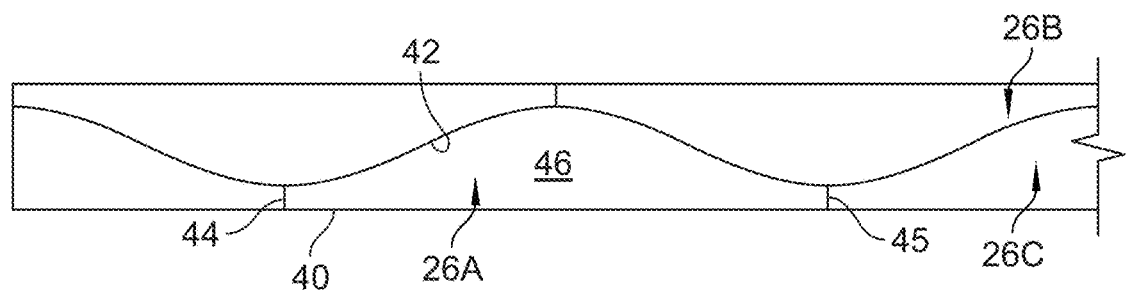
FIG. 9 is a diagrammatic view of a cutting pattern for forming a layer of the cushion of FIG. 3.
Figure 10:
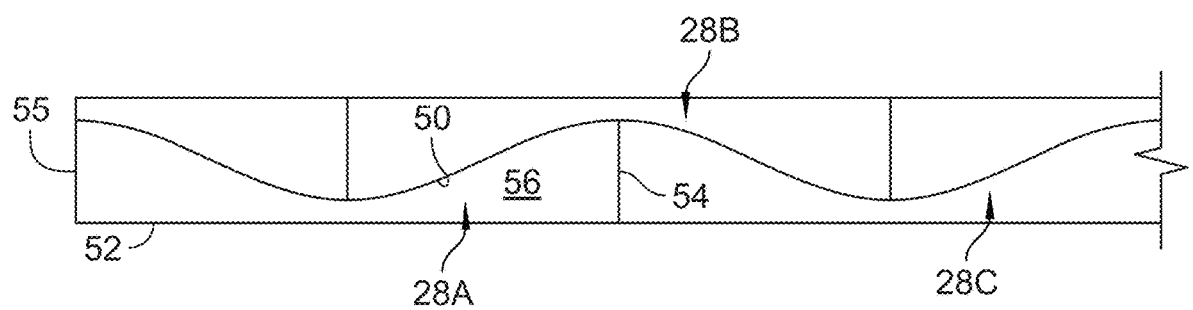
FIG. 10 is a diagrammatic view of a cutting pattern for forming another layer of the cushion of FIG. 3.

A method of making the seat cushion 12 includes a number of steps. The method includes providing a first material having a first stiffness as shown in FIG. 9 and providing a second material having a second stiffness that is different from the first stiffness as shown in FIG. 10. Illustratively, the first and second material are separate components; however, the first and second material may be the same material and formed to be monolithically or as separate components with different stiffness properties based on the manufacturing process.

The first layer 26 is formed from the first material. The first layer 26 is made with the planar first surface 40 and the non-planar second surface 42 spaced apart from and opposite the first surface 40. A first portion of the wave pattern or other contour is cut into the first material to form the second surface 42 of the first layer 26. As suggested in FIG. 9, the first layer 26 is cut from a block of the first material and the wave pattern allows for a first layer 26A to be cut while simultaneously cutting a portion of another first layer 26B that may be used with the same or another cushion 12. In this way, a third piece of a first layer 26C can be made and so on and so forth. The first material may be cut to form the first surface 40 of the first layer 26. The first material is cut to form the lateral sides 44, 45.

The second layer 28 is formed from the second material as suggested in FIG. 10. The second layer 28 is made with the non-planar first surface 50 and the planar second surface 52 spaced apart from and opposite the first surface 50. A second portion of the wave pattern or other contour is cut into the second material to form the first surface 50 of the second layer 28. As suggested in FIG. 10, the second layer 28 is cut from a block of the second material and the wave pattern allows for a second layer 28A to be cut while simultaneously cutting a portion of another second layer 28B that may be used with the same or another cushion 12. In this way, a third piece of a second layer 28C can be made and so on and so forth. The second material may be cut to form the second surface 52 of the second layer 28. The second material is cut to form the lateral sides 54, 55.

The second surface 42 of the first layer 26 is nested into the first surface 52 of the second layer 28. If the layers 26, 28 are separate components, the layers 26, 28 are aligned and placed together into engagement. If the layers 26, 28 are built up in a machining process, the nesting occurs simultaneously with the buildup process. The lateral sides 44, 45, 46, 47 are aligned with the lateral sides 54, 55, 56, 57. A cover and/or liner may be arranged around the layers 26, 28 to provide the cushion 12.

Figure 11:
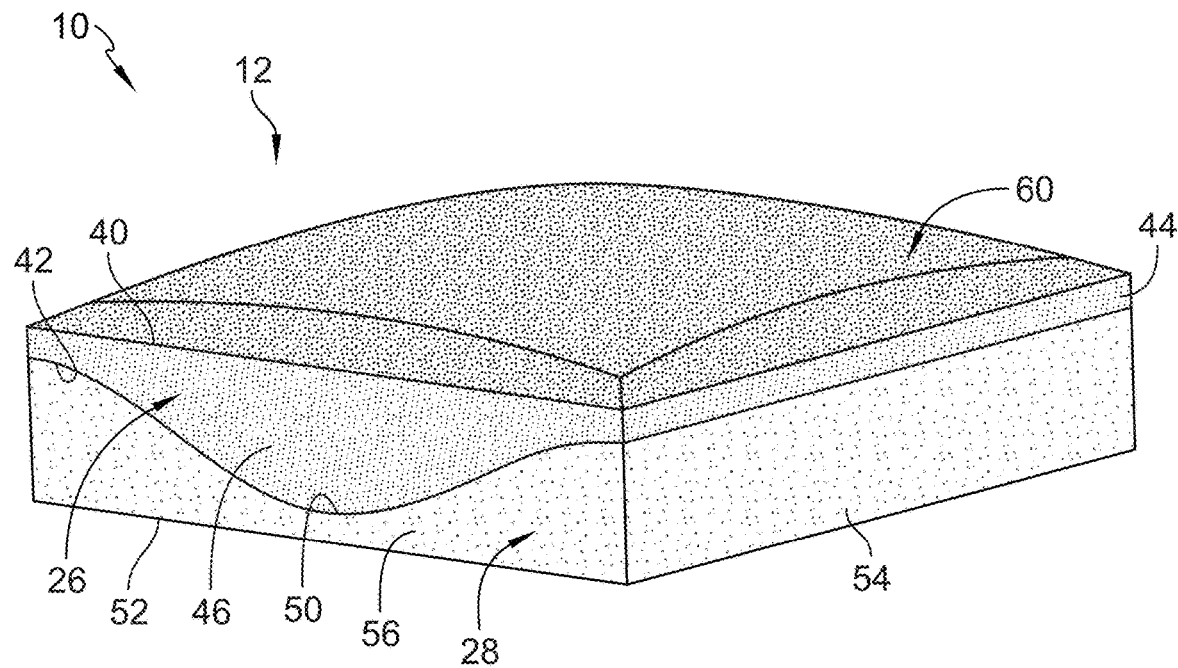
FIG. 11 is a perspective view of the cushion of FIG. 3 with an additional layer of support material on top of the first layer.
Figure 12:
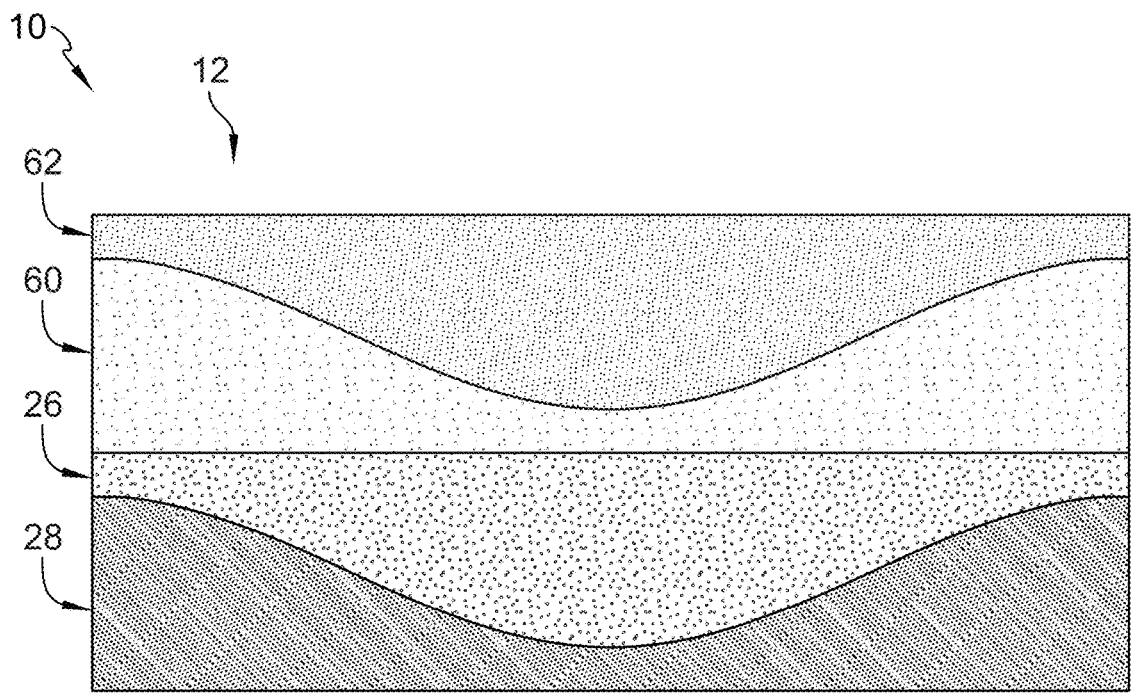
FIG. 12 is an elevation view of a cushion having four layers of varying stiffness to provide different comfort sensations to the occupant based on the orientation of the cushion.

As previously mentioned, multiple layers can be utilized to create the desired comfort and support of the occupant as suggested in FIGS. 11, 12, and 18. As shown in FIG. 11, the cushion 12 has a three-layer construction with a loose fiber fill top layer 60. The loose fiber fill layer 60 is contained in a liner that gives the loose fiber fill a desired shape. The addition of the loose fiber fill layer 60 may lower the initial resistance of the cushion 12 to the occupant and therefore may give a "softer" feeling. The loose fiber fill layer 60 conforms to the user similar to the first and second layers 26, 28 as described above. The loose fiber layer 60 can be added on top, bottom, in between layers, or any combination within the construction.

The loose fiber fill layer 60 can be integrated into the fabric shell or cover, integrated into a liner 64 that houses all layers together separate from the fabric shell, or an individual compartment that gives the loose fiber fill its shape. Additionally, the fill compartment is not limited to loose fiber fill. The fill layer 60 may include one or more of expanded polystyrene beads, shredded polyurethane foam, or other fill materials. The liner compartment allows multiple fill materials to be layered in between, on top of, or beneath other layers that otherwise could not stand alone.

As an example, FIG. 18 shows a cushion 12 having a first layer 26 having a first stiffness, a second layer 28 having a second stiffness, and a third layer 60 having a third stiffness. The layer 26 may be foam, the second layer 28 may include loose beads or foam material in a shaped liner 64, and the third layer 60 may include loose fiber fill in another liner or a compartment of the liner 64. As another example, FIG. 12 shows a cushion 12 having a first layer 26, second layer 28, third layer 60, and a fourth layer 62. Each layer 26, 28, 60, 62 may have a unique stiffness and contour compared to the other layers 26, 28, 60, 62.

Figure 19:
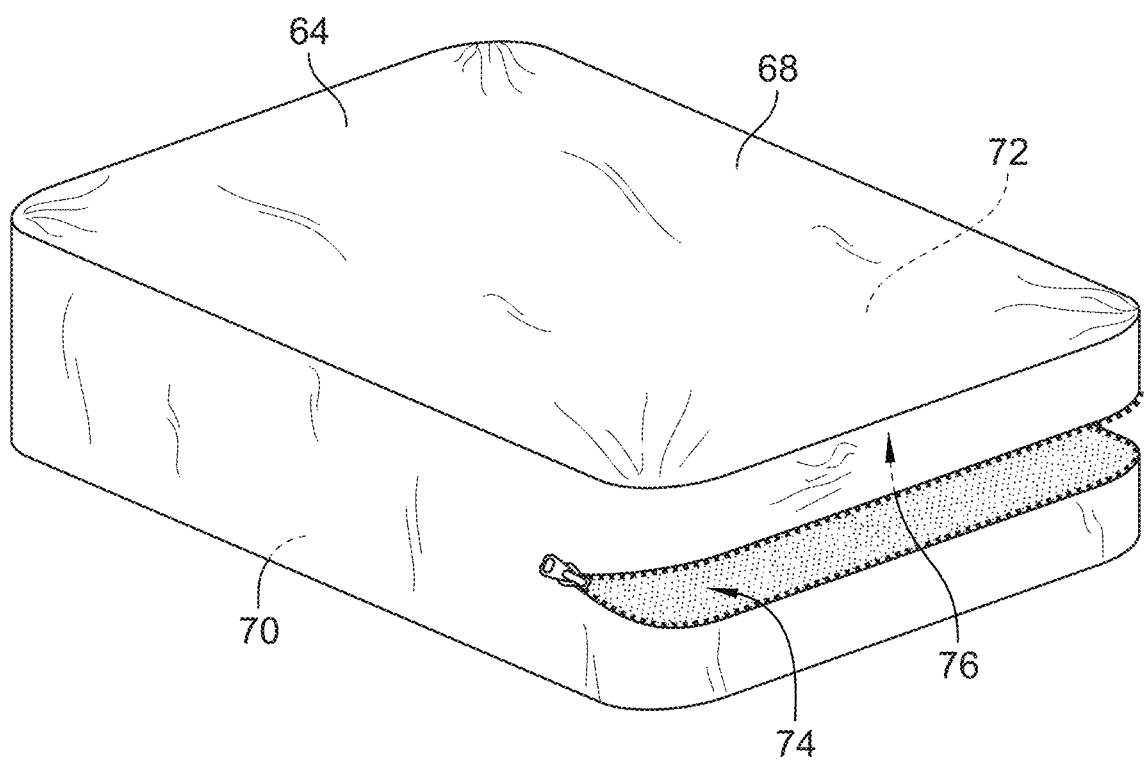
FIG. 19 is a perspective view of a liner arranged to receive the cushion of FIG. 3 in a first chamber of the liner, the liner having a second chamber for receiving loose fill therein.
Figure 20:
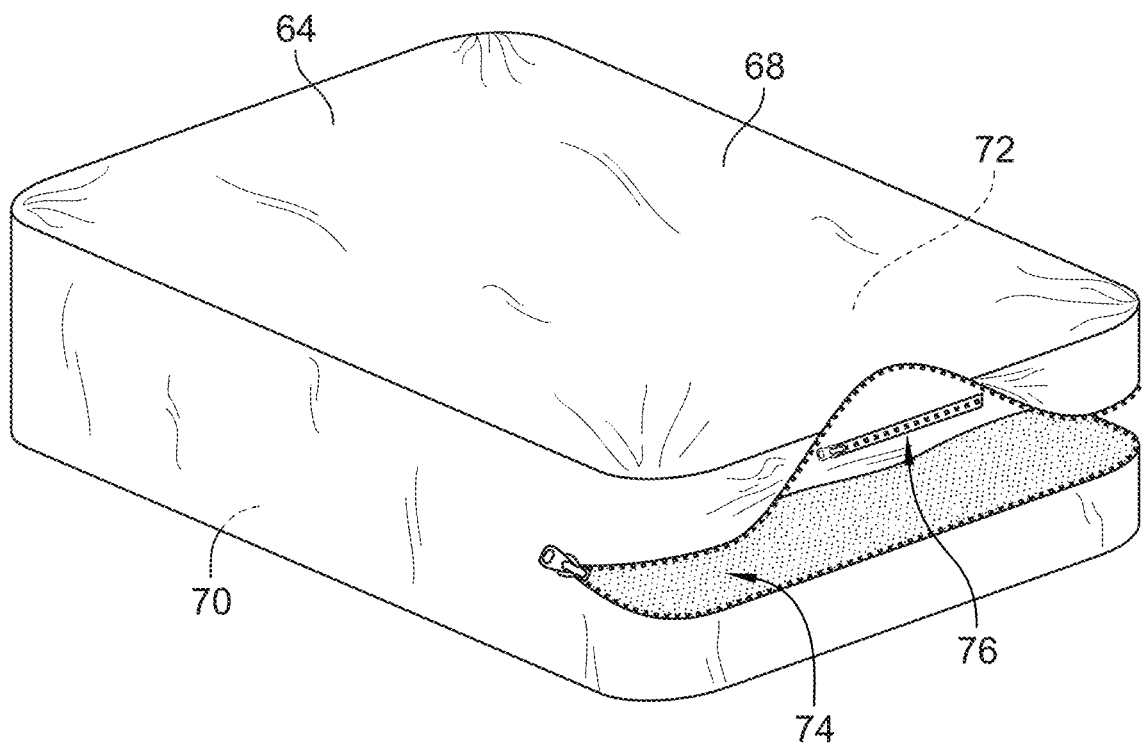
FIG. 20 is a perspective view of the liner of FIG. 19 showing the liner includes a first opening that opens into the first chamber and a second opening that opens to the second chamber and is accessible through the first opening.

The liner 62 includes a shell 68 sized to receive the cushion 12 as shown in FIGS. 19 and 20. The shell 68 of the liner 62 is formed to define a first chamber 70 that receives the cushion 12 therein and a second chamber 72 with loose filling 60 therein. The first layer 26, the second layer 28, and any other similar layers of the cushion 12 are located in the first chamber 70. The cushion 12 is located in the liner 62 to locate the first surface 40 between the second surface 52 and the second chamber 72.

The liner 62 includes a first closable opening 74 that opens into the first chamber 70 to allow the cushion 12 to be removed and re-inserted into the first chamber 70. The opening 74 may include a zipper, hook and loop, button, or other suitable alternative for selectively closing the opening 74. The chamber 70 allows for the same cushion 12 to be inserted, rotated and inserted, or a different or new cushion 12 to be inserted, as examples. The liner 62 includes a second closable opening 76 that opens into the second chamber 72 and the first chamber 70 to provide access to the second chamber 72 from the first chamber 70. In other words, the second chamber 72 is not accessible through an exterior of the liner 62 in the illustrative embodiment and, instead, is accessible via reaching into the first chamber 70 and through the opening 76. The opening 76 and the opening 74 are on a same side of the liner 62.

Figure 21:
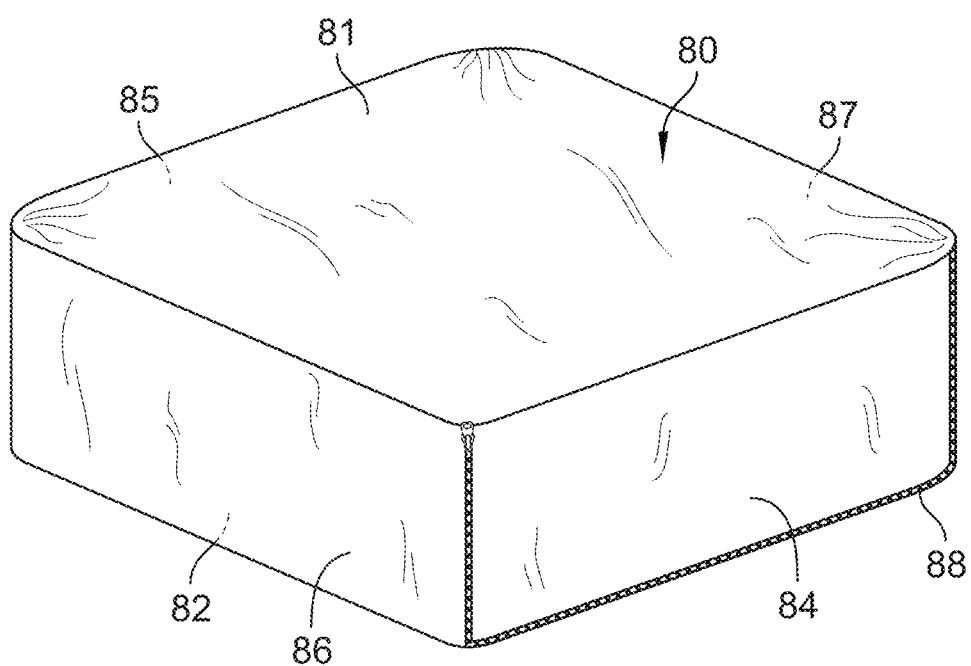
FIG. 21 is a perspective view of the seat of FIG. 5 showing the cushion of the present disclosure in a cover and the cover having a closable opening that extends along three sides of one of the faces of the cover so that the cushion is rotatable 90 degrees without the opening being visible when viewing the seat from a distance.

A cover 80 arranged around the cushion 12 (with or without liner 64) is shown in FIG. 21. The cover 80 has a surface 81, a surface 82 opposite the surface 81, and side walls 84, 85, 86, 87 that extend between and interconnect the surfaces 81, 82. The cover 80 is formed to define an opening 88 with a perimeter that extends along edges between side wall 84 and side walls 86, 87 and surface 82. In other words, the perimeter of the opening 88 extends along less than all edge of the side wall 84. In conventional covers, the opening is defined parallel to the surfaces 81, 82 and extends through side wall 84 and partway along surface 86, 86. Such conventional openings are hidden and do not interact with the occupant because only the side wall 85 is designed to face forward. In the seat 10 and cushions 12 of the present disclosure, the cushion 12 is rotated to have different side walls 84, 85, 86, 87 face front and touch or interface with the occupant. The opening 88 formed on only one side of the cover 80 allows the cushion 12 to be rotated 90 degrees with no portion of the opening 88 facing front.

According to the present disclosure, a seat or seat cushion may include modular support configurations comprising of multiple layers. The layers may include any regions within the cushion whose physical and/or chemical properties differ from the neighboring layer (even if the layers are formed together, bonded together, or cannot be physically separated without destroying the cushion), that distributes the applied load or dampens the rate of loading differently depending on the orientation of the applied load. The cushion may comprise flexible compartments that join layers of loose and solid support material together and maintains their configuration during loading and unloading.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A seat for supporting an occupant thereon, the seat comprising:
  a furniture base having a seat bottom for supporting the occupant;
  a cushion positioned on the seat bottom, the cushion including a first layer having a first surface and a non-planar second surface spaced apart from and opposite the first surface of the first layer and a second layer having a non-planar first surface and a second surface spaced apart from and opposite the first surface of the second layer, the second surface of the first layer being a matching and opposite contour of the first surface of the second layer and engaged with the first surface of the second layer, the first layer has a first stiffness, and the second layer has a second stiffness different from the first stiffness; and
  wherein the seat bottom and the cushion are sized such that the cushion is positionable on the seat bottom in a plurality of orientations relative to the seat bottom to provide varying comfort sensations to the occupant based on the orientation of the cushion, the plurality of orientations including a first orientation defined by the second surface of the second layer facing the seat bottom, a second orientation defined by the cushion being arranged 90 degrees about a first axis from the first orientation and the second surface of the second layer facing the seat bottom, a third orientation defined by the cushion being flipped over to be arranged 180 degrees about a second axis perpendicular to the first axis from the first orientation and the first surface of the first layer facing the seat bottom, and a fourth orientation defined by the cushion being arranged 90 degrees about the first axis from the third orientation and the first surface of the first layer facing the seat bottom.

2. The seat of claim 1, wherein the first surface of the first layer is generally planar, the second surface of the second layer is generally planar, and the contour of the second surface of the first layer extends without varying shape between a first lateral side of the cushion and a second lateral side of the cushion, the first lateral side extending between and interconnecting the first surface and the second surface of the first layer, and the second lateral side extending between and interconnecting the first surface and the second surface of the cushion of the first layer.

3. The seat of claim 2, wherein the contour of the second surface of the first layer is symmetric about a line extending perpendicular to the first surface of the first layer and the second surface of the second layer and located midway between the first lateral side and the second lateral side of the cushion.

4. The seat of claim 1, wherein the second surface of the first layer is defined by a first portion of a wave pattern and the first surface of the second layer is defined by a second portion of the wave pattern.

5. The seat of claim 4, wherein the first portion of the wave pattern includes a single peak of the wave pattern and the second portion of the wave pattern includes only two peaks of the wave pattern.

6. The seat of claim 5, wherein the wave pattern is a sinusoidal wave pattern.

7. The seat of claim 6, wherein the second material is different from the first material.

8. The seat of claim 7, wherein the first surface of the first layer and the second surface of the second layer are square when viewed from above and the first surface of the first layer is generally parallel with the second surface of the second layer.

9. The seat of claim 8, further comprising a liner arranged around the cushion, the liner formed to define a first chamber that receives the cushion therein and a second chamber with loose filling therein, the liner includes a first closable opening that opens into the first chamber to allow the cushion to be removed and re-inserted into the first chamber, the liner includes a second closable opening that opens into the second chamber and the first chamber to provide access to the second chamber from the first chamber, and the cushion is located in the liner to locate the first surface of the first layer between the second surface of the second layer and the second chamber.

10. A seat for supporting an occupant thereon, the seat comprising:
a cushion including a first portion having a first stiffness and a second portion adjacent the first portion and having a second stiffness different than the first stiffness, the first portion having a non-planar first end profile, and the second portion having a non-planar second end profile, the first end profile matching and opposite the second end profile,
wherein the cushion has a first surface and a second surface spaced apart from and opposite the first surface to locate the first end profile and the second end profile between the first surface and the second surface, and the cushion has a same area footprint, defined by viewing the cushion from above and looking in the direction of the first surface and the second surface, for a first orientation, a second orientation rotated 90 degrees relative to a first axis from the first orientation, a third orientation rotated 180 degrees relative to a second axis perpendicular to the first axis from the first orientation, and a fourth orientation rotated 90 degrees about the first axis relative to the third orientation.

11. The seat of claim 10, wherein the first end profile is defined by a first portion of a wave pattern having a single peak of the wave pattern and the second end profile is defined by a second portion of the wave pattern having a single trough of the wave pattern.

12. The seat of claim 10, wherein the first portion is made of a first material and the second portion is made of the first material.

13. The seat of claim 10, further comprising a furniture base having a seat bottom for supporting the occupant and the cushion is positioned on the seat bottom, the cushion is movable relative to the furniture base, and wherein the seat bottom and the cushion are sized such that the cushion is positionable on the seat bottom in each of the first orientation, second orientation, third orientation, and fourth orientation relative to the seat bottom to provide varying comfort sensations to the occupant based on the orientation of the cushion.

14. The seat of claim 13, wherein the cushion is compressed between portions of the furniture base, adjacent cushions, or a portion of the furniture base and an adjacent cushion located on opposite sides of the cushion to removably couple the cushion with the furniture base.

* * * * *